United States Patent
Kaku

(10) Patent No.: US 9,720,632 B2
(45) Date of Patent: Aug. 1, 2017

(54) IMAGE FORMATION APPARATUS, METHOD FOR MANAGEMENT OF IMAGE FORMATION APPARATUS, AND NON-TRANSITORY STORAGE MEDIUM

(71) Applicant: Konica Minolta, Inc., Chiyoda-ku, Tokyo (JP)

(72) Inventor: Shinya Kaku, Itami (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

(21) Appl. No.: 15/192,167

(22) Filed: Jun. 24, 2016

(65) Prior Publication Data

US 2016/0378406 A1    Dec. 29, 2016

(30) Foreign Application Priority Data

Jun. 25, 2015    (JP) .................................. 2015-127520

(51) Int. Cl.
    *G06F 3/12*    (2006.01)
    *H04N 1/00*    (2006.01)

(52) U.S. Cl.
    CPC .......... *G06F 3/1205* (2013.01); *G06F 3/1211* (2013.01); *G06F 3/1275* (2013.01); *H04N 1/00244* (2013.01); *H04N 1/00408* (2013.01); *H04N 2201/0094* (2013.01)

(58) Field of Classification Search
    None
    See application file for complete search history.

(56) References Cited

U.S. PATENT DOCUMENTS

| | | | | |
|---|---|---|---|---|
| 5,303,336 A | * | 4/1994 | Kageyama | G06F 3/1293 358/1.13 |
| 5,617,518 A | * | 4/1997 | Kuwamoto | G06F 3/12 358/1.13 |
| 6,814,512 B2 | * | 11/2004 | Kato | G06F 3/1204 358/1.15 |
| 2011/0299120 A1 | * | 12/2011 | Sekine | G06F 3/1221 358/1.15 |
| 2011/0317215 A1 | * | 12/2011 | Ida | G06F 3/1222 358/1.15 |
| 2012/0229851 A1 | * | 9/2012 | Nishida | G06F 3/1203 358/1.15 |

FOREIGN PATENT DOCUMENTS

| | | |
|---|---|---|
| JP | 2010049579 A | 3/2010 |
| JP | 2012146326 A | 8/2012 |
| JP | 2012248150 A | 12/2012 |
| JP | 2014016705 A | 1/2014 |

* cited by examiner

*Primary Examiner* — Thomas D Lee
(74) *Attorney, Agent, or Firm* — Cantor Colburn LLP

(57) ABSTRACT

There is provided an image formation apparatus that can prevent a system from having a reduced throughput even when the system includes an increased number of image formation apparatuses. When each MFP included in the system detects a presence of a user within a predefined range, the MFP notifies another MFP of the detection result. Each MFP determines, based on the detection result, a group of one or more MFPs from which the MFP of interest requests a list of one or more jobs issued by the user, more preferentially than another MFP, and the MFP of interest notifies another MFP accordingly.

15 Claims, 8 Drawing Sheets

IMAGE FORMATION APPARATUS, METHOD FOR MANAGEMENT OF IMAGE FORMATION APPARATUS, AND NON-TRANSITORY STORAGE MEDIUM

CROSS REFERENCE TO RELATED APPLICATIONS

This application is based on Japanese Patent Application No. 2015-127520 filed with the Japan Patent Office on Jun. 25, 2015, the entire content of which is hereby incorporated by reference.

BACKGROUND OF THE INVENTION

Field of the Invention

This disclosure relates to an image formation apparatus, a method for management of the image formation apparatus, and a non-transitory storage medium, and particularly to an image formation apparatus used in a print system composed of a plurality of image formation apparatuses, a method for management of the image formation apparatus, and a non-transitory storage medium.

Description of the Related Art

There has been proposed a system allowing a plurality of image formation apparatuses such as MFPs (Multi-Functional Peripherals) to be connected to a network to allow ubiquitous printing. This system is also called a ubiquitous print system or the like. For example, Japanese Laid-Open Patent Publications Nos. 2014-016705, 2012-146326, 2010-049579, 2012-248150, etc. disclose various techniques relevant to a printing system including a plurality of printers.

Furthermore, as an image formation apparatus is functionally enhanced and accordingly has a server function, the system has a tendency to exclude a server therefrom. Such a system is also called a serverless ubiquitous print system or the like.

In the serverless ubiquitous print system, any of image formation apparatuses functions as a server, and passes a job list to an image formation apparatus to which a user logs in. Thus, the user can confirm at the image formation apparatus that the user logs in to a job that the user has issued himself/herself and is spooled in the image formation apparatus that functions as the server, and the user can instructs the logged in image formation apparatus to print the job.

Such a system is often constructed in an office environment for example. Accordingly, as the office expands in scale, there is an increasing need to include more image formation apparatuses in the system.

However, a system composed of more image formation apparatuses results in the image formation apparatus to which the user logs in inquiring of more image formation apparatuses whether there is a job spooled which the user has issued. This leads to increasing a load of communication within the system. This results in the system having a reduced throughput.

SUMMARY OF THE INVENTION

An object in one aspect of this disclosure is to provide an image formation apparatus, a method of management of the image formation apparatus, and a control program, that can prevent a system from having a reduced throughput even when the system includes an increased number of image formation apparatuses.

According to an embodiment, an image formation apparatus is capable of communicating with one or more other image formation apparatuses. The image formation apparatus comprises: a request unit configured to request a list of one or more jobs issued by a logged in user from the one or more other image formation apparatuses; a job processing unit configured to obtain a selected job in the list from an image formation apparatus of the one or more other image formation apparatuses that spools the job, and execute the job; a storage unit configured to store for each user a group of one or more image formation apparatuses given a high priority for the request unit to request the list therefrom; a detection unit configured to detect a presence of a user within a predefined range; a first notification unit configured to notify the one or more other image formation apparatuses of a result of detection of the presence of the user by the detection unit; a determination unit configured to determine the group for the user, based on a result of detection of the presence of the user at the one or more other image formation apparatuses, received from the one or more other image formation apparatuses; a second notification unit configured to notify the one or more other image formation apparatuses of information about an image formation apparatus belonging to the group determined by the determination unit; and an update unit configured to update the group for the user, that is stored in the storage unit, to the determined group. The request unit requests the list from an image formation apparatus which belongs to the group for the logged in user more preferentially than an image formation apparatus which does not belong to the group.

According to another embodiment, a method is a method for management of each of a plurality of image formation apparatuses capable of communicating with one another. Each image formation apparatus is configured to request a list of one or more jobs issued by a logged in user from one or more other image formation apparatuses, and obtain a selected job in the list from an image formation apparatus of the one or more other image formation apparatuses that spools the job and execute the job. This method includes: detecting a presence of a user at each image formation apparatus within a predefined range; notifying, by a first image formation apparatus at which the user's presence is detected within the range of the plurality of image formation apparatuses, a second image formation apparatus of a result of detection of the presence of the user at the first image formation apparatus; determining, by the second image formation apparatus, based on the result of detection of the presence of the user at the first image formation apparatus, received from the first image formation apparatus, a group of one or more image formation apparatuses having a high priority for requesting the list for the user therefrom; notifying, by the second image formation apparatus, the first image formation apparatus of information about the one or more image formation apparatuses belonging to the determined group; and updating, by each image formation apparatus belonging to the determined group, a group for the user that is stored in a memory to the determined group.

According to another embodiment, a non-transitory storage medium encoded with a computer readable program executed by an image forming apparatus capable of communication with one or more other image forming apparatuses is provided. Each image formation apparatus is configured to request a list of one or more jobs issued by a logged in user from the one or more other image formation apparatuses, and obtain a selected job in the list from an image formation apparatus of the one or more other image formation apparatuses that spools the job and execute the job. The program causes the image formation apparatus to perform: obtaining from the one or more other image formation apparatuses a result of detection of a presence of a user at the one or more other image formation apparatuses within a predefined range; determining, based on the result of detection of the presence of the user at the one or more other image formation apparatuses, a group of one or more image formation apparatuses having a high priority for requesting the list for the user therefrom; and when the one or more other image formation apparatuses belong to the group, notifying the one or more other image formation apparatuses of information about one or more image formation apparatuses belonging to the determined group.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereafter, reference will be made to the drawings to describe the present invention in embodiments. In the following description, identical parts and components are identically denoted. Their names and functions are also identical. Accordingly, they will not be described repeatedly.

First Embodiment

<System Configuration>

Figure 1:
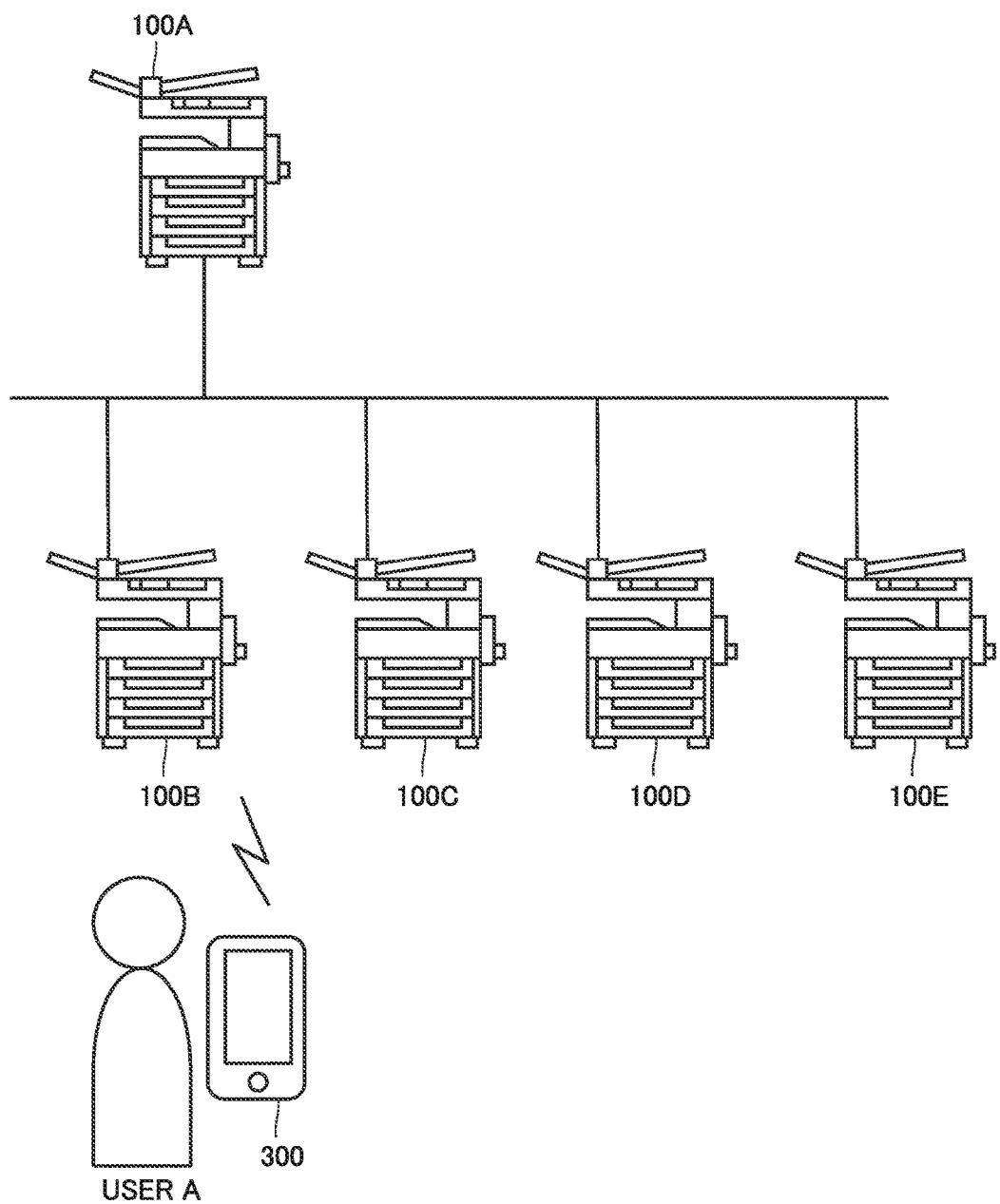
FIG. 1 represents a specific example of a configuration of an image processing system (hereinafter referred to as a system) according to an embodiment.

FIG. 1 represents a specific example of a configuration of an image processing system (hereinafter referred to as a system) according to the present embodiment. With reference to FIG. 1, the system according to the present embodiment includes a plurality of MFPs (Multi-Functional Peripherals) each of which is an example of an image formation apparatus. A plurality of MFPs 100A-100E is also represented as an MFP 100.

MFPs 100A-100E can communicate with each other. Communications between MFPs 100 may be done via a wire or wirelessly.

MFP 100 has a function for detecting a nearby user's presence. The function includes a function to perform wireless communications with a terminal device 300 which a user carries with him/her, as an example. Wireless communications between MFP 100 and terminal device 300 are short-distance wireless communication, for example. The short-distance wireless communication between MFP 100 and terminal device 300 is Bluetooth® for example. Accordingly, MFP 100 can wirelessly communicate with terminal device 300 when terminal device 300 is present in a range allowing the wireless communication. MFP 100 previously stores user information in association with terminal device 300. When MFP 100 can wirelessly communicate with terminal device 300, MFP 100 detects that the user associated with terminal device 300 is present near MFP 100. Note that MFP 100 may determine a single user's position based on wireless communication with a mobile phone, a tablet terminal or a similar, plurality of terminal devices that the user owns, and MFP 100 may detect that the user associated with these terminal devices is present near MFP 100.

The function of MFP 100 to detect a nearby user's presence is not limited to a function utilizing wireless communication with terminal device 300. Alternatively, it may be a function to detect a nearby user's presence by communicating with the user via human body communication, reflection of an infrared ray or the like, image analysis, or a combination thereof. Furthermore, MFP 100 may obtain positional information from terminal device 300 and compare the positional information with MFP 100's previously stored positional information to detect that the user associated with terminal device 300 is present near MFP 100.

<Apparatus Configuration>

Figure 2:
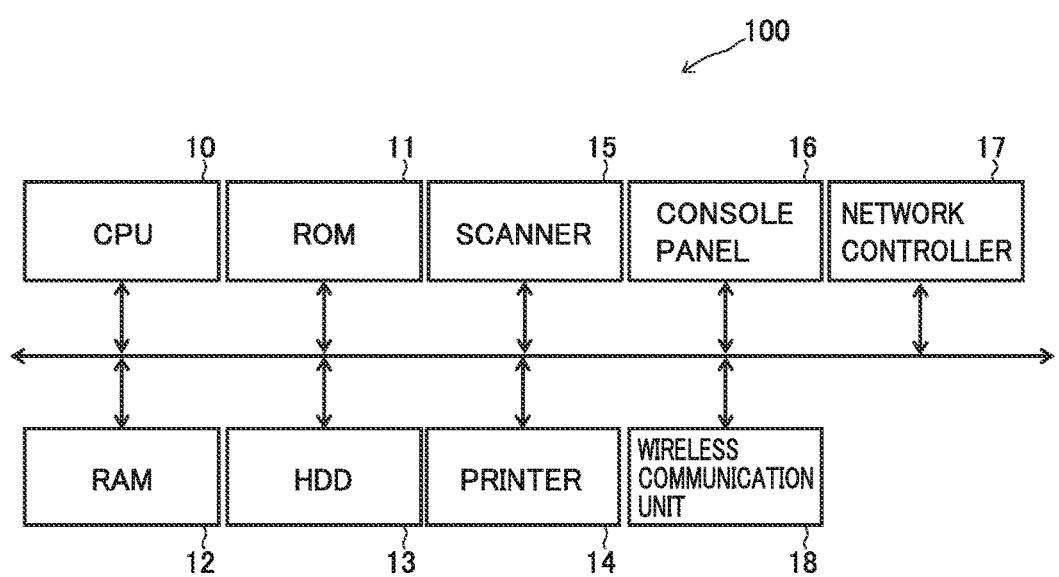
FIG. 2 is a block diagram representing one example of a configuration as an apparatus of an MFP (Multi-Functional Peripheral) included in the system.

FIG. 2 is a block diagram representing one example of a configuration of MFP 100 as an apparatus. With reference to FIG. 2, MFP 100 includes a CPU (Central Processing Unit) 10 for generally controlling the apparatus, a ROM (Read Only Memory) 11 for storing a program executed by CPU 10, a RAM (Random Access Memory) 12 serving as a working area when CPU 10 executes the program, and a HDD (Hard Disk Drive) 13 for storing a variety of types of data such as image data.

Furthermore, MFP 100 includes a printer 14, a scanner 15, and a console panel 16. Furthermore, MFP 100 includes a network controller 17 for communicating with another MFP, and a wireless communication unit 18 for performing wireless communications with terminal device 300.

<Outline of Operation>

Figure 3:
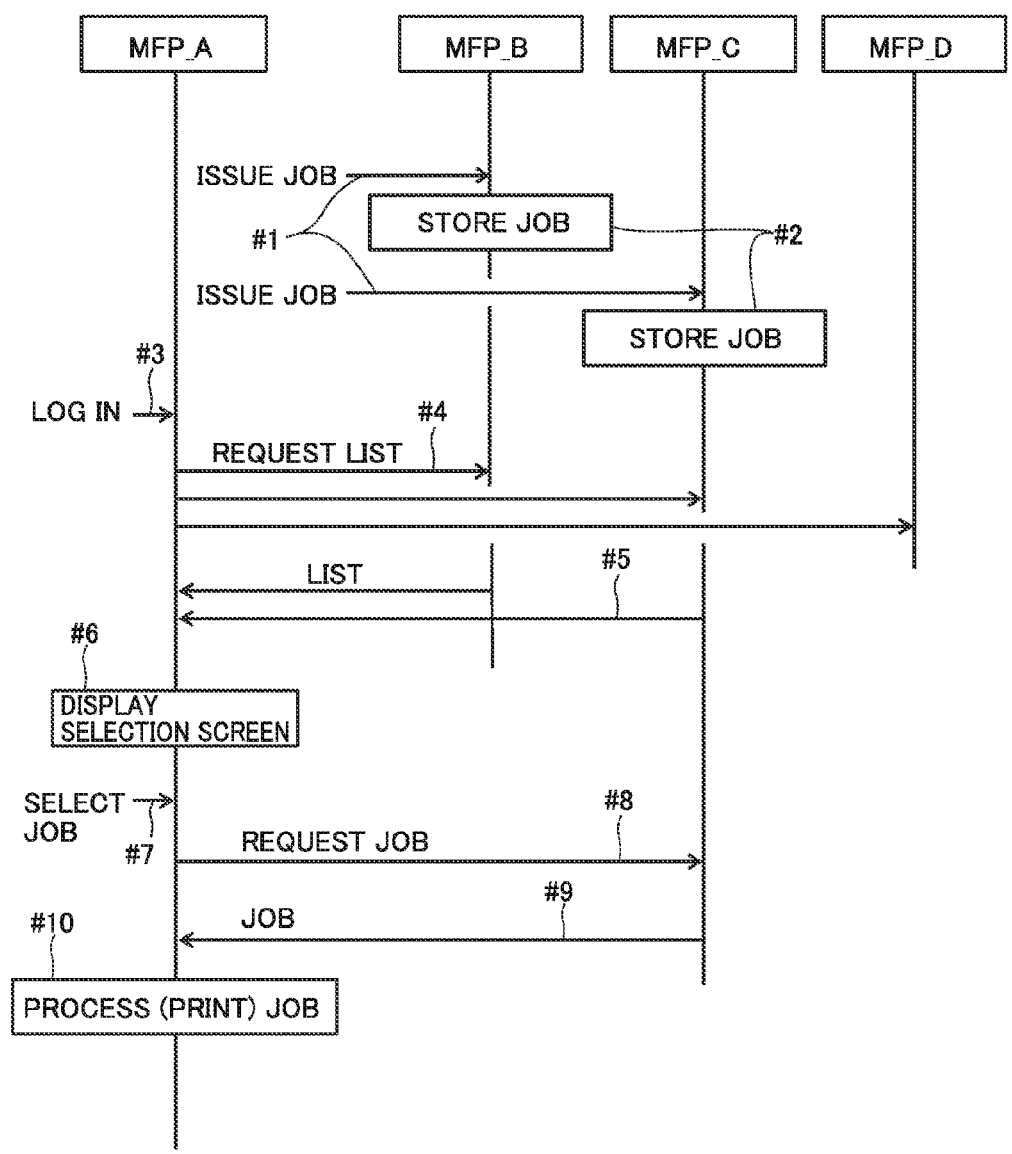
FIG. 3 is a diagram for illustrating a flow of processing a job in the system.

The present system is a system allowing ubiquitous printing. FIG. 3 is a diagram for illustrating a flow of processing a job by the present system. At least one of the plurality of MFPs has a function of a server. The MFP having the server function functions as a document server in the system and stores (or spools) a job which the user issues. The MFP that stores a job is also called a storage MFP. The system including an MFP having the server function may exclude a dedicated document server, as shown in FIG. 1. A system allowing ubiquitous printing and excluding a document server is also called a serverless ubiquitous system. The present system is a serverless ubiquitous system.

With reference to FIG. 3, when a user issues a job (step #1), the job is stored to an MFP_B and/or an MFP_C of a plurality of an MFP_A to an MFP_D which have/has a function of a server (step #2).

The Storage MFP is at least one MFP of the plurality of MFP_A to MFP_D. Which MFP of MFP_A to MFP_D is set as a storage MFP to store the issued job therein may be previously set for the user, or may be determined based on a free space of a memory of each MFP available when the system receives the job.

When one MFP_A of the plurality of MFP_A to MFP_D receives the user's login (step #3), MFP_A confirms for each MFP whether there is a job associated with the logged in user (step #4). An MFP which receives a user's login is also called a logged in MFP.

In step #4, the logged in MFP requests from each MFP a job list which is information about the job of interest. The job list includes information, such as a job name, a date and time of creation, data size, etc., for example.

Of the MFPs having received the request, an MFP which stores the job of interest, or a storage MFP, i.e., MFP_B and/or MFP_C, transmit/transmits the job list to MFP_A (step #5).

MFP_A displays a screen, based on the received job list, for selecting the job (step #6). When the job is selected by the logged in user from the displayed jobs (step #7), MFP_A requests that job from an MFP (for example, MFP_C) which stores the selected job (step #8). MFP_A obtains the selected job from MFP_C (step #9), and performs a process such as printing according to the user's instruction (step #10).

In step #4, if a request for a job list is issued to all MFPs, the more MFPs the system includes, the more communications in step #4. Accordingly, in this system, a group of MFPs having a high priority in serving as a requestee for a job list is previously set for each user. A logged in MFP requests a job list of a logged in user from an MFP which belongs to a group stored for the user more preferentially than an MFP which does not belong to the group. When the logged in MFP does not obtain the job list from any of the MFPs of the group, it may determine that there is no job of interest, or may request the job list from an MFP which does not belong the group, i.e., has low priority.

In that case, the storage MFP is preferably at least one MFP in a group of one or more MFPs associated with the user. Which MFP of the group is set as a storage MFP to store an issued job therein may previously be set for each user, or may be determined based on a free space of a memory of each MFP belonging to the group, that is available when the system receives the job.

Furthermore, in the present system, a group associated with a user is determined based on the user's activity, and a previously determined group associated with that user is updated. In other words, in the present system, an MFP in a vicinity of which a user is (or was) present belongs to a group associated with the user. This is because an MFP closer to the user is more likely to be used by the user. It is preferable that an MFP which is more likely to be used, i.e., logged in, by a user be set as a storage MFP for the user. This is because a possibility is increased that it is unnecessary to perform a process to transfer the job from the storage MFP to the logged in MFP, that is required for the logged in MFP to process the job.

Figure 4:
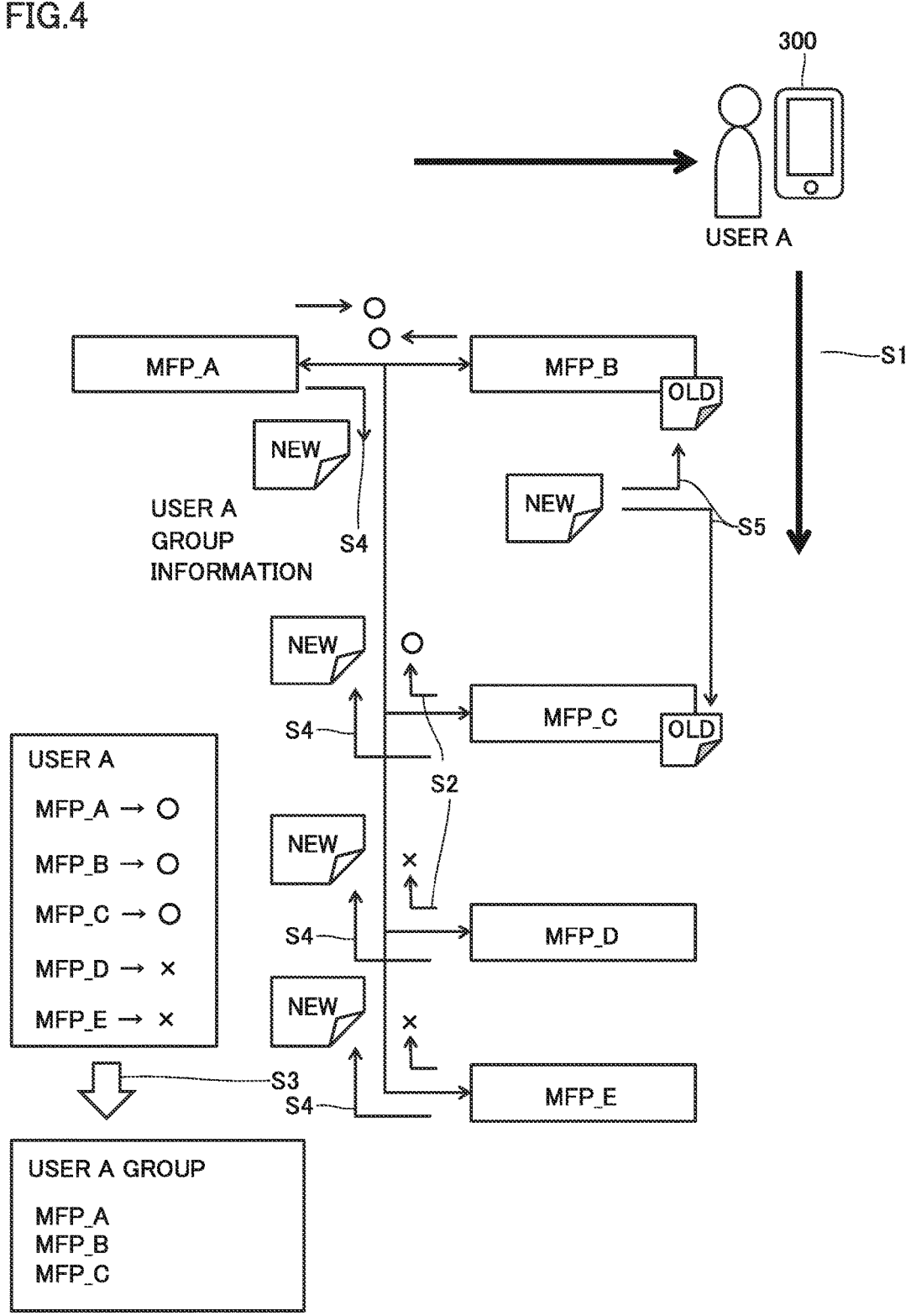
FIG. 4 is a diagram for illustrating a flow of an operation to determine a group in the system.

FIG. 4 is a diagram for illustrating a flow of an operation to determine a group in the system. With reference to FIG. 4, each of the plurality of MFP_A to MFP_D detects, based on a state of communication with terminal device 300, that a user A memorized in association with terminal device 300 is present within a predefined range (step S1). And each of MFP_A to MFP_D notifies each MFP within the present system of a result of the detection (step S2). The notification in step S2 may be performed: whenever user A's presence is detected; at a point of time at which user A's presence is detected frequently as predefined; or when user A's presence is detected for a predefined period of time (e.g., a time zone, a day of the week, etc.).

Alternatively, in step S2, the MFP may further determine whether the notification is required based on how the user uses the MFP. For example, in step S2, the MFP may issue the notification of the result of the detection when the user is detected as frequently as or more frequently than a predefined frequency and also uses the MFP in an amount (in how many sheets are copied, how many times facsimile transmission and reception are done, etc.) equal to or greater than a predefined amount.

Alternatively, in step S2, the MFP may determine whether it is necessary to issue the notification, based on a right previously set for the user to use the MFP. For example, in step S2, the MFP may issue the notification of the result of the detection when the user is detected as frequently as or more frequently than a predefined frequency and also has a right to use the MFP.

Each of the plurality of MFP_A to MFP_D determines, based on a result of detection at each MFP, a group of MFPs from which the MFP requests a job list for user A (step S3). Note that the plurality of MFPs may include an MFP set by an administrator or particular user to be excluded from the group. In that case, each MFP previously stores information which identifies the thus set MFP, and each MFP determines a group excluding the thus set MFP even when the thus set MFP also provides a detection result indicating that the user is detected. Furthermore, a coefficient may previously be designated for a result of detection of the user at each of the plurality of MFP_A to MFP_D. In that case, each MFP previously stores a coefficient for each MFP or a coefficient of each MFP for each user, and weights the detection result in each MFP to correspond to the coefficient and then determines a group based on the detection result. The above coefficient may be set and changed by a corresponding user, an administrator, or a similar, particular user.

Preferably, in step S3, each MFP may determine a group for the user, based on how frequently the user's presence is detected. For example, in step S3, each MFP may determine an MFP that has detected user A's presence even once as an MFP to belong to the group of user A, or an MFP that detects user A's presence as frequently as or more frequently than a predefined frequency as an MFP to belong to the group of user A. Furthermore, in step S3, each MFP may determine an MFP which detects user A's presence during a predefined period of time (e.g., a time zone, a day of the week, etc.) or an MFP which detects user A's presence during that period of time as frequently as or more frequently than a predefined frequency, as an MFP to belong to user A's group. For example, when, of MFP_A to MFP_D, MFP_A to MFP_C detect user A's presence as frequently as or more frequently than a predefined frequency, each MFP may determine MFP_A to MFP_C as MFPs to belong to user A's group. Thus determining a user's group based on how frequently the user is detected allows an MFP to which the user more likely to approach to compose a group associated with the user. Note that the number of MFPs belonging to the group may have a limit. In that case, each MFP for example determines a number of MFPs falling within the limit, as counted from an MFP that detects the user most frequently, as MFPs to belong to the group.

Preferably, in step S3, each MFP further determines a group for the user, based on how the user uses each MFP. For example, in step S3, the MFP refers to the user's history of using each MFP, and determines an MFP that detects the user as frequently as or more frequently than a predefined frequency and is also used by the user in an amount (in how many sheets are copied, how many times facsimile transmission and reception are done, etc.) equal to or greater than a predefined amount, an MFP that has the user's history of using it for a predefined period of time (e.g., for one week as counted from the current point in time retrospectively), and/or the like, as an MFP to belong to the group.

Preferably, in step S3, each MFP further determines a group for the user, based on a right previously set for the user to use each MFP. For example, in step S3, the MFP refers to the user's previously stored right to use each MFP, such as monochrome/color, paper size, and the like, and determines an MFP which detects the user as frequently as or more frequently than a predefined frequency and is also permitted to be used by the user or is usable by the user, as an MFP to belong to the group. Alternatively, in step S3, each MFP cooperates with a physical access control system (not shown), and determines a group for the user, based on whether the MFP of interest is an MFP installed in a room which the user is permitted to enter.

Preferably, in step S3, each MFP further determines that one or more MFPs of one or more MFPs belonging to the group determined for the user, as a storage MFP for the user. The storage MFP may be an MFP that the user most frequently uses, an MFP that detects the user most frequently, or an MFP having a largest free space. Preferably the MFP determines as the user's storage MFP an MFP which does not serve as a storage MFP for another user. More specifically, preferably, if the MFP determines as a storage MFP an MFP which has already served as a storage MFP for another user, then, the MFP determines as the storage MFP for the user an MFP which is a runner-up satisfying the above condition, an MFP which serves as a storage MFP for a small number of users, or the like. Note that a storage MFP may be determined at a point in time at which the user has issued a job.

Each of the plurality of MFP_A to MFP_D notifies each MFP of an MFP included in the group of user A determined in step S3 (Step S4). An MFP of the plurality of MFP_A to MFP_D that is at least included in the group of user A updates information of a group of user A previously determined and stored in memory to information of the group of user A that the MFP is notified of in step S4 (step S5).

As represented in FIG. 1, when the present system includes a small number of MFPs and communications can be done between all of the MFPs, the MFPs share a result of each MFP detecting whether user A is present nearby. Accordingly, as shown in FIG. 4, each MFP determines for user A a group of MFPs identically.

However, when the present system includes an increased number of MFPs, and all of the MFPs communicate their detection results with each other, traffic congestion will be caused. Accordingly, preferably, the plurality of MFPs are divided into two or more MFP sets and mutually transmit their detection results within the sets. In that case, at least one MFP belongs to at least two of the plurality of sets.

Figure 5:
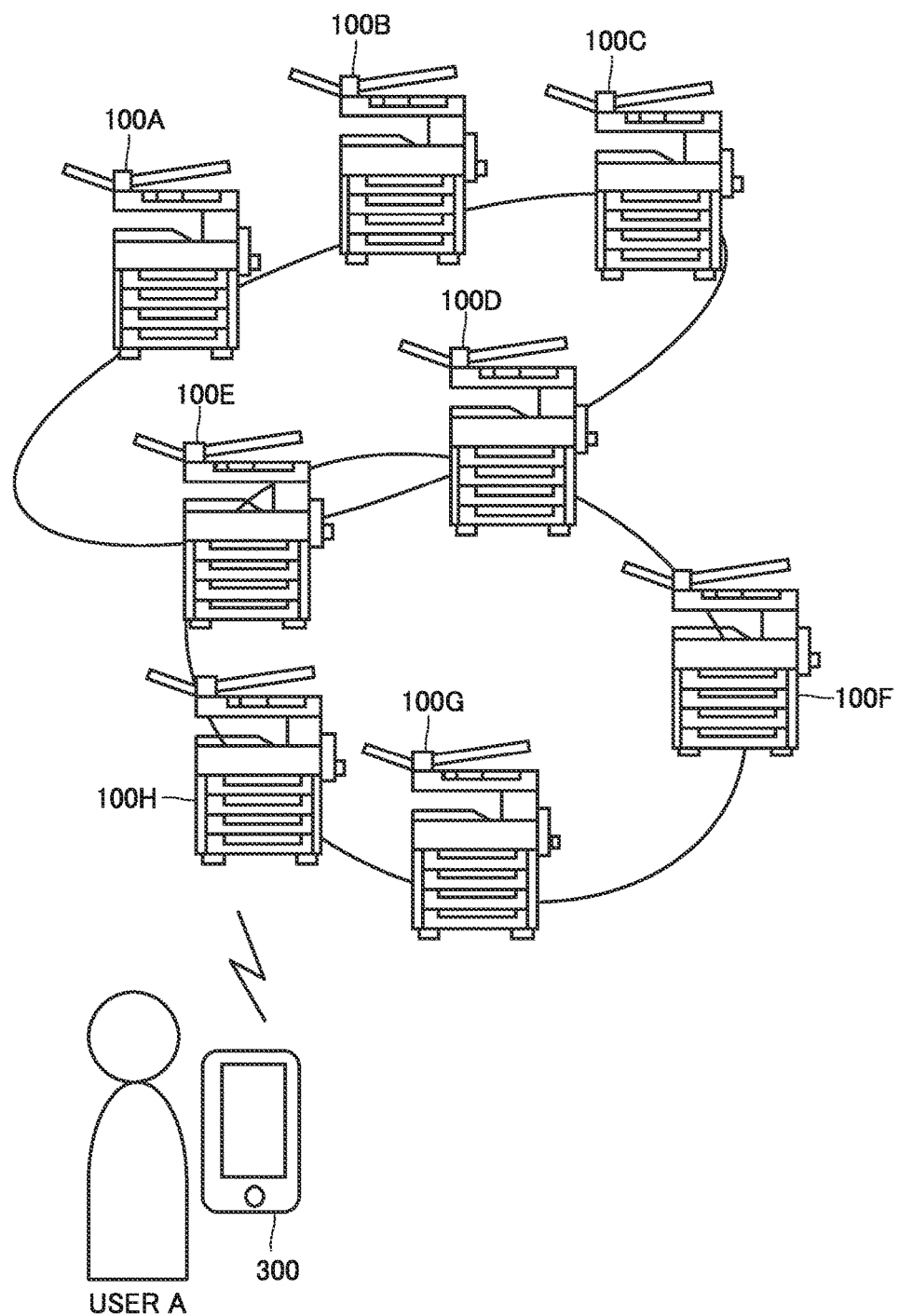
FIG. 5 is a diagram representing another example in configuration of the system.

FIG. 5 represents another example in configuration of the present system. As the other example, when the present system includes a plurality of MFPs 100A-100H, MFP 100A to MFP 100E and MFP 100D to MFP 100H are divided into a first set and a second set, respectively. Each MFP communicates with the other MFPs in the MFP set to which the MFP per se belongs. MFP 100D and MFP 100E belong to both of the two sets of the first and second sets.

Figure 6:
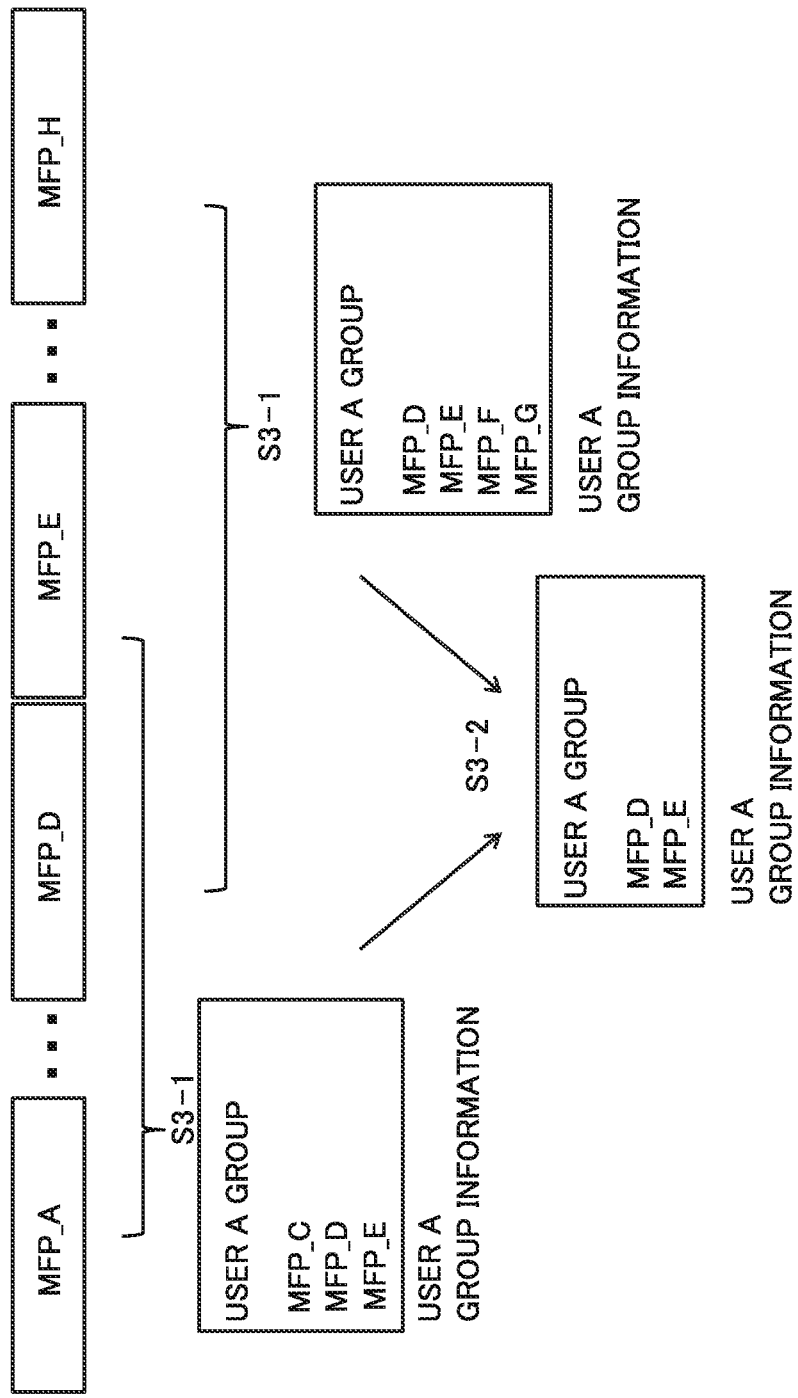
FIG. 6 is a diagram for illustrating a method for determining a group when the system has the configuration of FIG. 5.

In the configuration of FIG. 5, in step S2, each MFP notifies the other MFPs in the set to which the MFP per se belongs of a result of detection of user A's presence. FIG. 6 is a diagram for illustrating a method for determining a group when the system has the configuration of FIG. 5. With reference to FIG. 6, in the first set, when, of MFP_A to MFP_E, MFP_C to MFP_E detect user A's presence, each MFP belonging to the first set by way of example determines MFP_C to MFP_E as MFPs to belong to user A's group (step S3-1). Furthermore, in the second set, when, of MFP_D to MFP_H, MFP_D to MFP_G detect user A's presence, each MFP belonging to the second set by way of example determines MFP_D to MFP_G as MFPs to belong to user A's group (step S3-1). The above determination method represented in FIG. 6 at step S3-1 is identical to the determination method represented in FIG. 4 at step S3. A group determined at step S3-1 is determined by using only results of detection of user A's presence at the MFPs in a set of interest, and accordingly, it is called a "provisionally determined" group.

An MFP belonging to all of the two or more sets obtains information of the group provisionally determined in each of the two or more sets. When the present system has the configuration of FIG. 5, MFP_D and MFP_E belonging to both sets both obtain the information of the groups provisionally determined in both sets. That is, MFP_D and MFP_E both obtain MFP_C to MFP_E and MFP_D to MFP_G provisionally determined as user A's group.

Accordingly, an MFP belonging to all of the two or more sets further determines a group for the user, based on the information of the group provisionally determined in each of the two or more sets.

As an example, MFP_D and MFP_E both determine an MFP which belongs to all of the provisionally determined two or more groups, as user A's group (step S3-2). In the case of the example of FIG. 6, MFP_D and MFP_E each determine MFP_D and MFP_E as user A's group. A group determined at step S3-2 is determined by using a result of detection of user A's presence at any MFP included in the two or more sets, and accordingly, it is called a "finally determined" group.

The method of final determination is not limited to the above method. As another example, an MFP belonging to two or more sets may determine as user A's group an MFP belonging to at least one group of provisionally determined groups.

The MFP belonging to all of the two or more sets notifies the other MFPs belonging to the set to which the MFP belongs of information of the group determined. Final determination and notification of information of a finally determined group are repeated so that even when the present system has three or more sets formed therein, all of the MFPs belonging to the present system will share user A's finally determined group.

<Functional Configuration>

Figure 7:
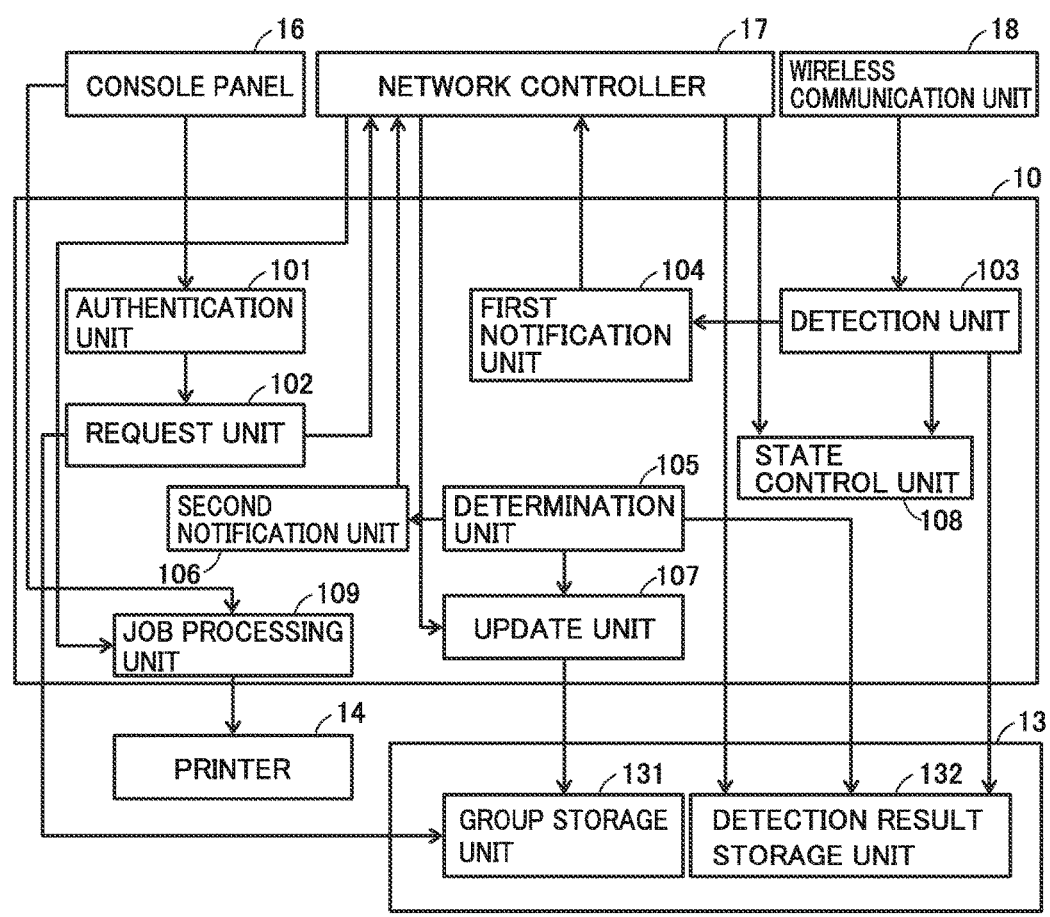
FIG. 7 is a block diagram representing one example of a functional configuration of the MFP.

FIG. 7 is a block diagram representing one example of a functional configuration of MFP 100 for performing the above operation. Each function of FIG. 7 is implemented mainly by MFP 100's CPU 10 reading onto RAM 12 a program stored in ROM 11, and executing the read program. However, at least a portion of the function may be implemented by other hardware represented in FIG. 2 or other hardware such as electrical circuitry etc. (not shown).

With reference to FIG. 7, CPU 10 of MFP 100 includes an authentication unit 101 for performing user authentication, and a request unit 102 for requesting a job list of a logged in user from another MFP when the user authentication is successfully done. HDD 13, which is an example of a memory, includes a group storage unit 131 which is a storage area for storing for each user information of a group associated with the user. Note that request unit 102 requests a job list from an MFP which belongs to the group for the logged in user more preferentially than an MFP which does not belong to that group.

Furthermore, CPU 10 includes a detection unit 103 for detecting that the user is present near MFP 100, and a first notification unit 104 for notifying another MFP of a detection result obtained in detection unit 103. Detection unit 103 has an association of terminal device 300 with a user previously stored therein, and detects the user's presence by having wireless communications allowed to be done with terminal device 300. Preferably, when detection unit 103 detects the user as frequently as or more frequently than a predefined frequency, first notification unit 104 notifies another MFP of the detection result.

The detection result in detection unit 103 is stored to detection result storage unit 132 which is a storage area provided in HDD 13 that is an example of a memory. Also stored to detection result storage unit 132 is a result of detection of the user at the other MFP received from that other MFP.

Furthermore, CPU 10 includes a determination unit 105, a second notification unit 106, and an update unit 107. Determination unit 105 determines a group for the user, based on a result of detection of the user stored in detection result storage unit 132. More specifically, determination unit 105 determines a group for the user, based on a result of detection of the user at MFP 100 and a result of detection of the user at another MFP received from the other MFP. Preferably, determination unit 105 further determines as a storage MFP for the user at least one of one or more MFPs belonging to the determined group.

Preferably, determination unit 105 determines a group for the user, based on how frequently the user's presence is detected at an MFP. Furthermore, preferably, determination unit 105 determines a group for the user, based on how the user uses each MFP. Furthermore, preferably, determination unit 105 determines at least one MFP as a storage MFP among MFPs belonging to the group determined for the user. Furthermore, preferably, determination unit 105 determines a group for the user, based on a right previously set for the user to use each MFP.

Second notification unit 106 notifies another MFP of information about an MFP belonging to a group determined by determination unit 105. Preferably, determination unit 105 finally determines an MFP belonging to at least one of a group provisionally determined by determination unit 105 and a group transmitted by another MFP, as an MFP to belong to the group for the user.

Once determination unit 105 has determined a group for the user, update unit 107 updates information of a group for the user that is stored in group storage unit 131 to the determined group's information. Alternatively, when update unit 107 receives from another MFP notification of information about an MFP belonging to the group for the user, update unit 107 updates information of a group for the user that is stored in group storage unit 131 to the information of the group of which update unit 107 is notified.

<Operation Flow>

Figure 8:
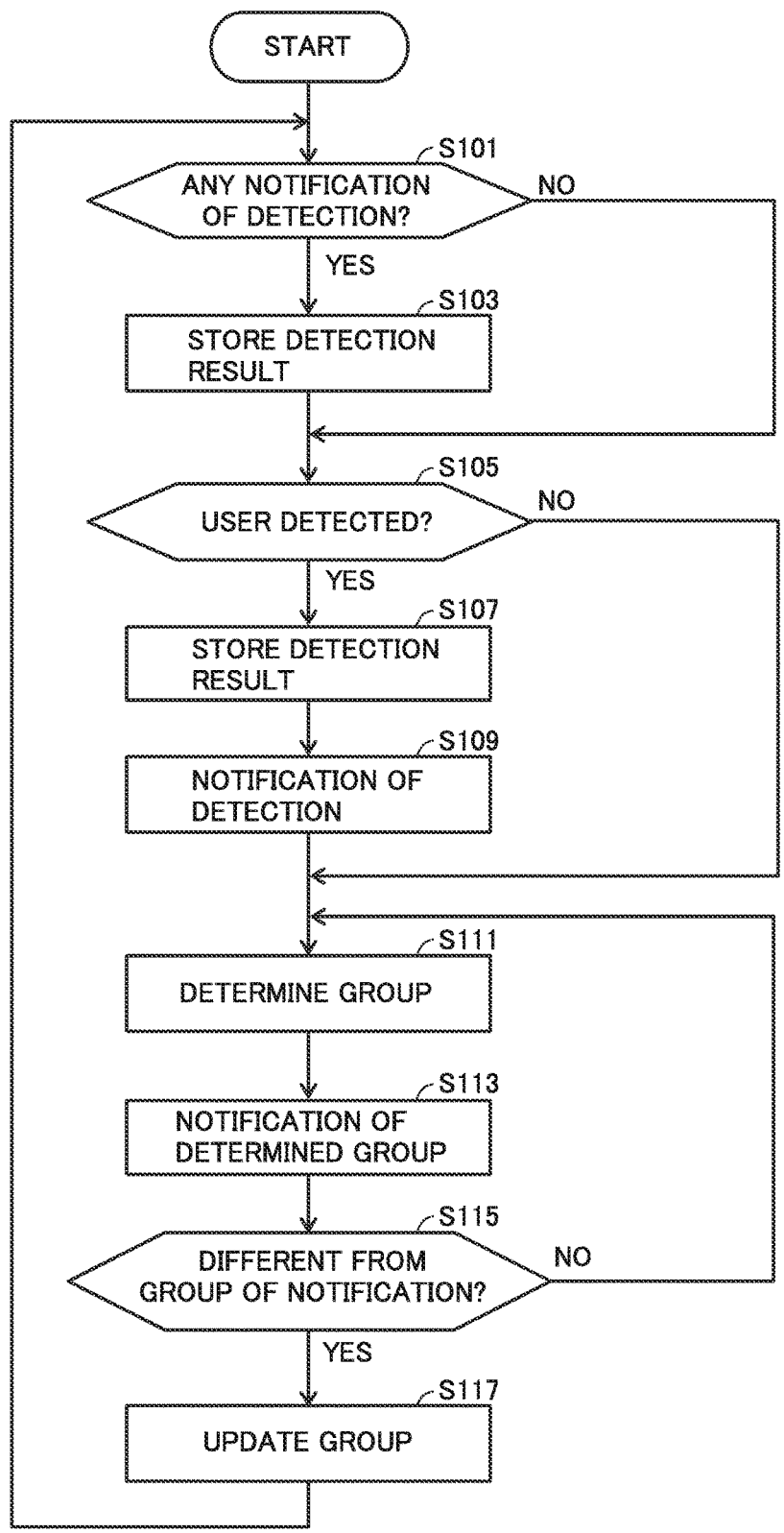
FIG. 8 is a flowchart representing an example of a flow of an operation of the MFP.

FIG. 8 is a flowchart representing an example of a flow of an operation of MFP 100. The operation represented in the FIG. 8 flowchart is implemented by MFP 100's CPU 10 reading onto RAM 12 a program stored in ROM 11, and executing the read program to exhibit each function of FIG. 7.

With reference to FIG. 8, when CPU 10 of MFP 100 is notified by another MFP of a result of detection of a user's presence near the other MFP (YES at step S101), CPU 10 stores the detection result to HDD 13 (step S103).

Furthermore, when CPU 10 detects the user's presence near MFP 100 (YES at step S105), CPU 10 stores the detection result to HDD 13 (step S107). Furthermore, CPU 10 notifies another MFP of the detection result in step S105 (step S109). At step S109, CPU 10 may notify another MFP of the detection result when a prescribed condition is satisfied such as when the user is detected as frequently as or more frequently than a predefined frequency.

CPU 10 determines a group for the user, based on a result of detection of the user at MFP 100 stored in HDD 13 and a result of detection of the user at another MFP (Step S111). CPU 10 notifies another MFP of information about an MFP belonging to the group determined in step S111 (Step S113).

When the group determined in step S111 matches groups determined at all other MFPs of which the MFP of interest is notified (NO at step S115), CPU 10 determines the determination made in step S111 as a final determination, and CPU 10 updates information of a group for the user that is stored in HDD 13 to information of the group determined in step S111 (Step S117).

In contrast, if the group determined in step S111 fails to match any one of the groups determined at the other MFPs of which the MFP of interest is notified by the other MFPs (YES at step S115), CPU 10 determines the determination made in step S111 as a provisional determination and again performs a process to determine a group. In other words, CPU 10 further determines a group for the user, based on information of a group determined in step S111 and information of the group that fails to match (Step S111). CPU 10 for example determines an MFP belonging to at least one of these groups as an MFP to belong to a group for the user. Until a group determined in step S111 matches groups determined at all other MFPs of which the MFP of interest is notified by the other MFPs, CPU 10 repeats Steps S111 and S113.

<Effect of Embodiment>

By performing the above operation, in the present system, a group of one or more MFPs to which an inquiry is made regarding a job issued by a user is automatically determined depending on the user's activity. Preferably in this system one or more MFPs of the above group are determined as a storage MFP for the user.

Accordingly, the group is automatically formed depending on the user's activity in an office, how the user uses an MFP, etc. and it is unnecessary for an administrator or a particular user to reset the group depending on the user's activity in the office, how the user uses the MFP, etc. As described above, when a storage MFP is set in the group of interest, the storage MFP will be set automatically depending on the user's activity. This can reduce traffic for an inquiry of a job list in the present system, job transmission and reception and the like, and can prevent the system from having a reduced throughput.

Second Embodiment

A group determined as described above for a user may be used not only for a reference for a job list but also for another process.

For example, an MFP's power state may be controlled depending on a result of detection of the user at an MFP belonging to the group. More specifically, when user A's presence is detected at at least one MFP belonging to user A's group, and the MFP is sleeping, the MFP may return to a normal state. Furthermore, as the at least one MFP notifies another MFP of a result of detection of user A, as described above, a configuration may be made such that when the MFP receiving the notification per se belongs to user A's group, and the MFP is sleeping, the MFP returns to the normal state.

In order to implement this operation, CPU 10 of MFP 100 further includes a state control unit 108, as represented in FIG. 7. State control unit 108 is a function which switches a power state between the sleep state and the normal state. When detection unit 103 detects user A's presence or notification is received from an MFP belonging to the group for user A indicating that user A's presence is detected and the power state is in the sleep state, state control unit 108 shifts the sleep state to the normal state.

By such an operation being performed, when a user approaches any of MFPs, the approached MFP and another MFP which the user highly likely to approach, i.e., use, return from the sleep state. Accordingly, the user can use the MFP at once without waiting for the MFP to return from the sleep state.

Furthermore, as another example, a job list of the user may previously be transmitted depending on a result of detection of the user at an MFP belonging to the group. More specifically, when user A's presence is detected at at least one MFP belonging to user A's group, the MFP may transmit a job list of one or more jobs of user A stored in a memory to another MFP belonging to user A's group. Furthermore, as the at least one MFP notifies another MFP of a result of detection of user A, as described above, the MFP having received the notification may transmit a job list of one or more jobs of user A stored in its own memory to another MFP belonging to user A's group. By such an operation being performed, when a user approaches any of MFPs, a job list in each MFP belonging to the group of the user is transmitted to the approached MFP and another MFP which the user highly likely to approach, i.e., use. Accordingly, the user can view a screen to select a job, based on the job list, at an MFP at once without waiting for a period of time for obtaining a job list.

Furthermore, as another example, when a storage MFP fails to transfer a job to a logged in MFP due to a communication error or the like, the storage MFP may transmit the job to an MFP other than the logged in MFP and belonging to user A's group.

The disclosed feature is implemented by one or more modules. For example, this feature may be implemented by a circuit element and other hardware module, by a software module which defines a processing which implements the feature, or by a combination of the hardware module and the software module.

It can also be provided as a program which is a combination of one or more software modules for causing the MFP or a similar image formation apparatus to perform the above-described operation. Such a program can be recorded in a flexible disk that is an accessory of a computer, a CD-ROM (Compact Disk-Read Only Memory), a ROM, a RAM, a memory card or a similar, computer readable recording medium and thus provided as a program product. Alternatively, it can also be recorded in a recording medium such as a hard disk incorporated in a computer, and thus provided. Furthermore, the program can also be provided by downloading via a network.

Note that the program according to this disclosure may invoke a required module of program modules provided as a portion of an operating system (OS) of a computer, in a prescribed sequence, as timed as prescribed, and may cause the module to perform a process. In that case, the program per se does not include the above module and cooperates with the OS to perform the process. Such a program that does not include the module can also be included in the program according to the present disclosure.

Furthermore, the program according to the present disclosure may be incorporated in and provided as a portion of another program. The present program in this case also per se does not include the module(s) included in the other program and cooperates with the other program to perform a process. Such a program incorporated in another program can also be included in the program according to the present disclosure.

A program product provided is installed in a program storing unit, such as a hard disk, and executed. Note that the program product includes a program per se and a recording medium having the program recorded therein.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image formation apparatus capable of communicating with one or more other image formation apparatuses, comprising:
a request unit configured to request a list of one or more jobs issued by a logged in user from the one or more other image formation apparatuses;
a job processing unit configured to obtain a selected job in the list from an image formation apparatus of the one or more other image formation apparatuses that spools the job, and execute the job;
a storage unit configured to store for each user a group of one or more image formation apparatuses given a high priority for the request unit to request the list therefrom;
a detection unit configured to detect a presence of a user within a predefined range;
a first notification unit configured to notify the one or more other image formation apparatuses of a result of detection of the presence of the user by the detection unit;
a determination unit configured to determine the group for the user, based on a result of detection of the presence of the user at the one or more other image formation apparatuses, received from the one or more other image formation apparatuses;
a second notification unit configured to notify the one or more other image formation apparatuses of information about an image formation apparatus belonging to the group determined by the determination unit; and
an update unit configured to update the group for the user, that is stored in the storage unit, to the determined group,
the request unit requesting the list from an image formation apparatus which belongs to the group for the logged in user more preferentially than an image formation apparatus which does not belong to the group.

2. The image formation apparatus according to claim 1, wherein the determination unit determines an image formation apparatus belonging to at least one of the group determined by the determination unit and the group transmitted by the one or more other image formation apparatuses, as an image formation apparatus to belong to a group for the user.

3. The image formation apparatus according to claim 1, wherein the determination unit determines the group for the user, based on how frequently the user's presence is detected at each image formation apparatus.

4. The image formation apparatus according to claim 1, wherein the determination unit determines the group for the user, based on how the user uses each image formation apparatus.

5. The image formation apparatus according to claim 1, wherein the determination unit further determines, based on how the user uses each image formation apparatus, at least one image formation apparatus for spooling among one or more image formation apparatuses belonging to the group the job issued by the user.

6. The image formation apparatus according to claim 1, further comprising a state control unit having as a power state a first state that is a power state allowing a job to be processed and a second state that is a power state incapable of allowing the job to be processed, for performing a control to switch the first state to the second state and vice versa, wherein when the power state is in the second state and notification is received from an image formation apparatus belonging to the group for the user indicating that the user's presence is detected, the state control unit shifts the power state from the second state to the first state.

7. The image formation apparatus according to claim 1, wherein the determination unit further determines the group for the user, based on a right predefined for the user to use an image formation apparatus.

8. A method for management of each of a plurality of image formation apparatuses capable of communicating with one another, each image formation apparatus being configured to request a list of one or more jobs issued by a logged in user from one or more other image formation apparatuses, and obtain a selected job in the list from an image formation apparatus of the one or more other image formation apparatuses that spools the job and execute the job, the method comprising:

detecting a presence of a user at each image formation apparatus within a predefined range;

notifying, by a first image formation apparatus at which the user's presence is detected within the range of the plurality of image formation apparatuses, a second image formation apparatus of a result of detection of the presence of the user at the first image formation apparatus;

determining, by the second image formation apparatus, based on the result of detection of the presence of the user at the first image formation apparatus, received from the first image formation apparatus, a group of one or more image formation apparatuses having a high priority for requesting the list for the user therefrom;

notifying, by the second image formation apparatus, the first image formation apparatus of information about the one or more image formation apparatuses belonging to the determined group; and updating, by each image formation apparatus belonging to the determined group, a group for the user that is stored in a memory to the determined group.

9. A non-transitory storage medium encoded with a computer readable program executed by an image forming apparatus capable of communication with one or more other image forming apparatuses, each image formation apparatus being configured to request a list of one or more jobs issued by a logged in user from the one or more other image formation apparatuses, and obtain a selected job in the list from an image formation apparatus of the one or more other image formation apparatuses that spools the job and execute the job, the program causing the image formation apparatus to perform:

obtaining from the one or more other image formation apparatuses a result of detection of a presence of a user at the one or more other image formation apparatuses within a predefined range;

determining, based on the result of detection of the presence of the user at the one or more other image formation apparatuses, a group of one or more image formation apparatuses having a high priority for requesting the list for the user therefrom; and when the one or more other image formation apparatuses belong to the group, notifying the one or more other image formation apparatuses of information about the one or more image formation apparatuses belonging to the determined group.

10. The non-transitory storage medium according to claim 9, wherein the determining includes determining an image formation apparatus belonging to at least one of the determined group and the group transmitted by the one or more other image formation apparatuses, as an image formation apparatus to belong to a group for the user.

11. The non-transitory storage medium according to claim 9, wherein the determining includes determining the group for the user, based on how frequently the user's presence is detected at each image formation apparatus.

12. The non-transitory storage medium according to claim 9, wherein the determining further includes determining the group for the user, based on how the user uses each image formation apparatus.

13. The non-transitory storage medium according to claim 9, wherein the determining includes determining, based on how the user uses each image formation apparatus, at least one image formation apparatus for spooling the job issued by the user among the one or more image formation apparatuses belonging to the group.

14. The non-transitory storage medium according to claim 9, having as a power state a first state that is a power state allowing a job to be processed and a second state that is a power state incapable of allowing the job to be processed, wherein the program causes the image formation apparatus to shift the power state from the second state to the first state when notification is received from an image formation apparatus belonging to the group for the user indicating that the user's presence is detected while the power state is in the second state.

15. The non-transitory storage medium according to claim 9, wherein the determining further includes determining the group for the user, based on a right predefined for the user to use an image formation apparatus.

* * * * *